United States Patent [19]

Hebron et al.

[11] Patent Number: 4,646,795

[45] Date of Patent: Mar. 3, 1987

[54] COMBINATION SCOOP AND FUNNEL UTENSIL

[75] Inventors: Lewis L. Hebron, Kentwood, Mich.; Neal Rampley, La Porte, Ind.

[73] Assignee: Heath Manufacturing Company, Coopersville, Mich.

[21] Appl. No.: 850,570

[22] Filed: Apr. 11, 1986

[51] Int. Cl.$^4$ ................................................ B65B 3/04
[52] U.S. Cl. ...................................... 141/98; 141/344
[58] Field of Search ......................... 141/98, 331–345, 141/392, 297–300, 199–205; D7/68

[56] References Cited

U.S. PATENT DOCUMENTS

| | | | |
|---|---|---|---|
| 42,356 | 4/1864 | Dubber | 141/344 |
| 100,420 | 3/1870 | Ledmun | 141/344 |
| 174,746 | 3/1876 | Tally | 141/331 |
| 195,846 | 10/1877 | Schippert | 141/344 |
| 220,576 | 10/1879 | Chillis | 141/98 |
| 843,873 | 2/1907 | De Veaux | 141/331 |
| 3,490,501 | 1/1970 | Manem et al. | 141/84 |

Primary Examiner—Houston S. Bell, Jr.
Attorney, Agent, or Firm—Price, Heneveld, Cooper, DeWitt & Litton

[57] ABSTRACT

A combination scoop/funnel filler utensil particularly adapted for the filling of differently sized bird feeders. The utensil includes a reservoir section and a handle section in communication therewith through a port, the sections being integrally molded from suitable plastic material. A valve plate, pivotable from a location adjacent the handle, is positioned within the reservoir. It can be manipulated to selectively open or close the port between the handle and reservoir, rendering the utensil useful as either a scoop or a funnel.

8 Claims, 5 Drawing Figures

COMBINATION SCOOP AND FUNNEL UTENSIL

BACKGROUND OF THE INVENTION

This invention relates to combination filler utensils and, more particularly, to a combination scoop/funnel utensil especially adapted for use in handling particulate matter such as bird seed and transferring the same from the bag or other bulk receptacle in which it is purchased to bird feeders of varying sizes and configurations.

Bird seed, customarily, is sold in bags. It must be transferred from these bags by the person wishing to make it available to the birds to a feeder. The feeder may be of the enlarged hopper type, such as shown generally in FIG. 1, of the tubular type, such as shown generally in FIG. 2, or of any one of a number of other sizes and configurations.

A conventional scoop is utilized typically to make this transfer and can be used with facility where the opening in the bird feeder through which the seed must pass is of substantial proportions. Where, however, the bird feeder intake opening is relatively small, such as is the case with many of the cylindrical feeders on the market, food typically is spilled when attempting to transfer it from the scoop to the feeder.

It is possible, of course, to use a much smaller scoop when filling the latter type feeder. The diminished capacity of the smaller scoop, however, makes the operation repetitive and tedious. It is also possible to utilize a separate funnel, transferring the feed from the scoop into the funnel and finally into the cylindrical feeder. This procedure requires two hands as well as the availability of the elusive funnel. There has existed a need, thus, for a unitary filler utensil which can be used with facility to fill all types of bird feeders, regardless of the dimensions of the feed-fill opening.

SUMMARY OF THE INVENTION

It is an object of this invention to provide such a filler utensil, the same comprising a combination scoop/funnel utensil particularly adapted for use with particulate matter such as bird seed. The combination comprises an integrally molded body including a generally tubular reservoir section having a generally tubular sidewall and an end wall, the end opposite from said end wall being generally open. The end wall has extending outwardly therefrom a generally tubular handle section, the handle section being open throughout its length and communicating with the interior of the reservoir section through a port.

A valve plate is pivotally mounted to and in abutment with the reservoir section side of the end wall. The valve plate has an aperture having a shape approximating that of the port. The valve plate is pivotable between an open position whereat the aperture is in general alignment with the port, permitting particulate matter to flow from the reservoir section into the handle section and a closed position whereat the aperture is out of alignment with the port. The valve plate, in the closed position, seals the port between the handle section and the reservoir section such that the particulate matter cannot pass therebetween.

Means are provided for retaining the valve plate in abutment with the reservoir section side of the end wall. Means are also provided, accessible from the exterior of the body section, for pivoting the valve plate from its open position to its closed position and vice versa.

The resultant utensil can be utilized as a scoop when the valve plate is in its closed position, the particulate matter entering and exiting the reservoir section through its open end. It can also be utilized as a funnel, particulate matter, in this case, entering the reservoir section through its open end and exiting the reservoir section through the handle when the valve plate is pivoted to its open position.

DETAILED DESCRIPTION OF THE INVENTION

Figure 1:
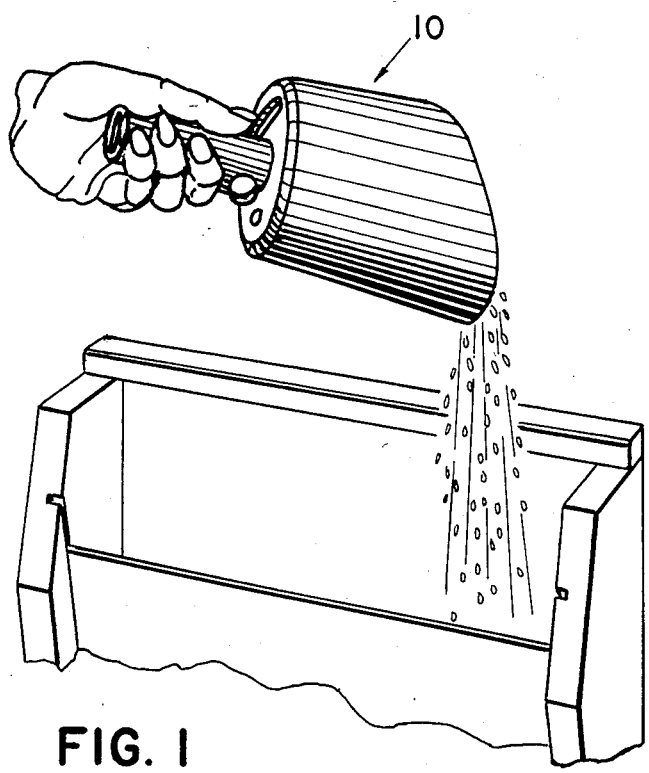
FIG. 1 is a fragmentary perspective view illustrating the utensil which is the subject of this invention being utilized as a scoop to fill a bird feeder having a relatively large feed intake opening.

The combination scoop/funnel utensil which is the subject of this invention, with reference to all of the Figures, is indicated generally by the reference numeral 10. It includes three separate parts (prior to assembly), each of which is integrally molded from a suitable plastic material, general-purpose polypropylene being the material of choice. These parts are the body 12, the valve plate 40 and the valve plate retainer 60.

The integrally molded body 12 includes reservoir section 14 and handle section 16. Reservoir section 14 is bounded by tubular sidewall 18 which is beveled at its open end 22 to facilitate the scooping of particulate matter from a bag or the like as well as discharging the same into a bird feeder such as illustrated fragmentarily in FIG. 1. Reservoir section 14 is bounded at its opposite extremity by end wall 24. Handle section 16 extends outwardly from end wall 24 and communicates with the interior of reservoir section 14 through port 26. The handle is open throughout its entire length, forming a funnel-discharge port 28 at its outermost extremity.

End wall 24 of reservoir section 14 has formed therein an arcuate slot 32 and a pivot pin aperture 34. A retainer receiving groove 36 is molded into the interior tubular sidewall 18 of reservoir section 14.

Figure 3:
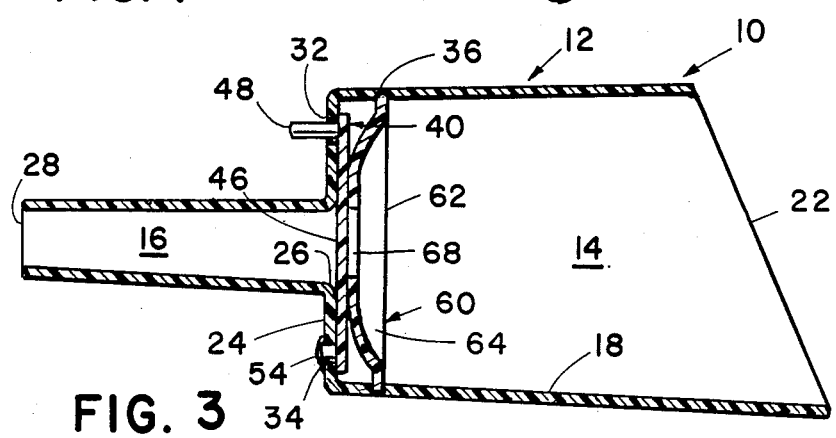
FIG. 3 is a side-elevational cross section of the utensil, the valve plate being shown in its closed position.
Figure 4:
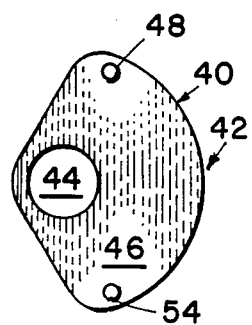
FIG. 4 is a front elevation of the valve plate.
Figure 5:
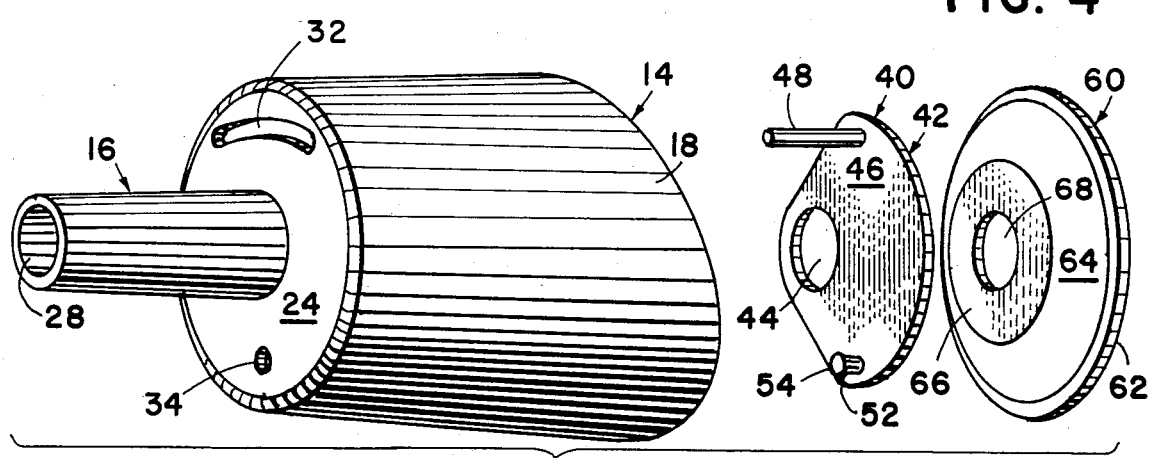
FIG. 5 is an exploded perspective illustrating the three component parts of the utensil and the manner in which they are assembled.

Valve plate 40, with particular reference to FIGS. 3-5, includes a flat body section 42 having an aperture 44 formed in one side thereof. Aperture 44 is generally identical in diameter to port 26. Body section 42 also includes a closure area 46 sized so as to effectively seal port 26 when valve plate 40 is in its closed position.

Valve plate 40 includes elongated actuator 48 which extends perpendicularly from body section 42. It also includes pivot pin 52 which is likewise perpendicular to body section 42. Pivot pin 52 is molded so as to include a swollen head 54, the purpose of which will become apparent hereinafter.

There are many possible configurations for the body section 42 of valve plate 40. Essential to any such configuration is the pivotability of the plate, when assembled to body 12, from a position in which aperture 44 is in alignment with port 26 (open position) to a position wherein closure area 46 is in alignment with port 26 (closed position) without interference from tubular sidewall 18 of the reservoir section 14.

The valve plate retainer 60, illustrated in FIGS. 3 and 5, includes an annular planar edge 62, concave wall 64 extending inwardly therefrom and a valve plate abutting flat 66 at the interior. Valve plate retainer 60 has an aperture 68 formed centrally therein. Aperture 68 is approximately the same diameter as port 26 and aligns therewith when the combination scoop/funnel utensil which is the subject of this invention is assembled.

Each of the components of the combination scoop/funnel utensil 10, as previously noted, is integrally molded by well-known injection molding techniques. The combination scoop/funnel utensil 10 is thereafter assembled by inserting valve plate 40 into reservoir section 14 through the open end 22 thereof, forcing swollen head 54 of pivot pin 52 through pivot pin aperture 34. During this process, actuator 48 passes through arcuate slot 32 and is thereafter accessible to the thumb, index finger, etc., of a user's hand who has grasped the utensil at handle section 16.

Once valve plate 40 is in place, the valve plate retainer 60 is pushed into the position shown in FIG. 3, the peripheral edge of planar section 62 nesting into the peripheral retainer groove 36. Tubular sidewall 18 is drafted so as to facilitate this insertion as well as molding of body 12—i.e., reservoir section 14, as well as handle section 16, taper outwardly slightly as viewed from left to right in FIG. 5. Groove 36 is positioned within tubular sidewall 18 such that, during this process, the valve plate 40 is sandwiched fairly tightly between end wall 24 of reservoir section 14 and valve plate abutting flat 66. There should be sufficient friction between these sandwiched components that valve plate 40 will stay in the position (open or closed) to which it has been moved by actuator 48. There must, of course, be sufficient clearance to permit operation of actuator 48 to move the valve plate from its open to closed position, etc., without unduly stressing the actuator.

Figure 2:
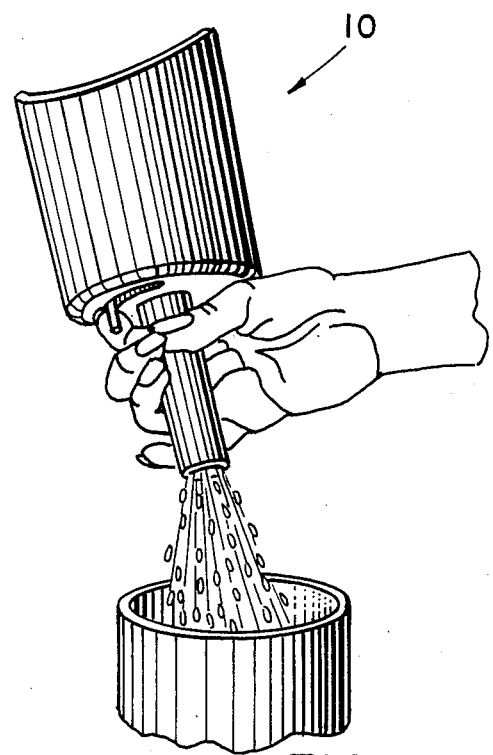
FIG. 2 is a fragmentary perspective view illustrating the utensil being utilized as a funnel to fill a cylindrical feeder having a feed intake opening of relatively small dimension.

The purchaser of the combination scoop/funnel utensil, so assembled, typically with valve plate 40 in its closed position, will grasp the utensil by handle 16, protrude reservoir section 14 into a bag of bird seed and fill the reservoir section through open end 22. Upon removal of the utensil 10 from the bag, the user may dispense the bird feed therefrom in typical scoop-like fashion if the feeder being filled has a sufficiently large opening to avoid spilling the seed (see FIG. 1). If, as illustrated in FIG. 2, the feeder has a relatively small opening, the user will tilt the utensil 10 such that open end 22 of reservoir section 14 is directed upwardly and the open end 28 of handle section 16 is positioned over the opening in the feeder to be filled. The user then manipulates actuator 48 pivoting valve plate 40 about pivot pin 52 until such time as aperture 44 comes into registry with aperture 68 and port 26. This permits the feed to pass out of reservoir section 14, through port 26, through handle 16 and into the feeder being filled. The concave wall 64 facilitates near-complete drainage of reservoir section 14 during this process. The length of arcuate slot 32, preferably, is such that actuator 48 will reach one end and thus abut end wall 24 when the valve plate is in its fully open position and abut the other end of slot 32 when the valve plate is in its fully closed position.

The utensil which is the subject of the present invention, thus, can be utilized to fill feeders or similar containers with particulate materials without concern for spillage despite drastic size variations between or among the containers being filled. It can be economically manufactured while still being "tough" from a serviceability standpoint and easy to use.

While a preferred embodiment of this invention and a modification thereof have been described in detail, it will be apparent to those skilled in the art that other embodiments and modifications may be conceived and fabricated without departing from the spirit and scope of this invention. Such other embodiments and modifications are to be deemed included within the scope of the appended claims unless these claims, by their language, expressly state otherwise.

The embodiments of the invention in which an exclusive property or privilege is claimed are defined as follows:

1. A combination scoop/funnel utensil for particulate matter such as bird seed comprising: an integrally molded body including a generally tubular reservoir section having a generally tubular sidewall and an end wall, the end opposite from said end wall being generally open, said end wall having extending outwardly therefrom a generally tubular handle section, said handle section being open throughout its length and communicating with the interior of said reservoir section through a port; a valve plate pivotally mounted to and in abutment with the reservoir section side of said end wall, said valve plate having an aperture therein having a shape approximating that of said port, said valve plate being pivotable between an open position whereat said aperture is in general alignment with said port permitting said particulate matter to flow from said reservoir section into said handle section and a closed position whereat said aperture is out of alignment with said port; said valve plate, in said closed position, sealing the port between said handle section and said reservoir section such that said particulate matter cannot pass therebetween; means for retaining said valve plate in abutment with said reservoir section side of said end wall; and means accessible from the exterior of said body section for pivoting said valve plate from said open position to said closed position and vice versa whereby said scoop/funnel utensil can be used as a scoop when said valve plate is in said closed position, said particulate material entering and exiting said reservoir section through said opposite end, and as a funnel, particulate matter entering said reservoir section through said opposite end and exiting said reservoir section through said handle when said valve plate is pivoted to said open position.

2. The utensil as set forth in claim 1 wherein said end wall has a slot therein, wherein said pivoting means comprises an actuator affixed to said valve plate and wherein said actuator protrudes through said slot, said actuator being shiftable in said slot to move said valve plate from said open to said closed position and vice versa.

3. The utensil as set forth in claim 2 wherein said valve plate further includes a pivot pin affixed thereto, and wherein said end wall has a pivot pin aperture therethrough, said pin passing through said pivot pin aperture.

4. The utensil as set forth in claim 3 wherein said pivot pin has a swollen head, said head being forced through said pivot pin aperture, thereafter locking said valve plate in pivotable relationship to said end wall.

5. The utensil as set forth in claim 3 wherein said retaining means comprises a retainer plate having a peripheral edge and a central aperture, said valve plate being sandwiched between said end wall and said retainer plate with said central aperture in general alignment with said port.

6. The utensil as set forth in claim 5 wherein said retaining means further comprises an interior peripheral groove in the interior of said tubular sidewall, said peripheral edge of said retainer plate being received in said groove.

7. The utensil as set forth in claim 6 wherein said retainer plate includes a concave wall and a valve plate abutting flat, said flat bordering said central aperture and abutting said valve plate, said concave wall facing toward said opposite end.

8. A combination scoop/funnel utensil for particulate matter such as bird seed comprising: an integrally molded body including a generally tubular reservoir section having a generally tubular sidewall and an end wall, the end opposite from said end wall being generally open, said end wall having extending outwardly therefrom a generally tubular handle section, said handle section being open throughout its length and communicating with the interior of said reservoir section through a port; a valve plate pivotally mounted to and in abutment with the reservoir section side of said end wall, said valve plate being pivotable between an open position whereat said port is unobstructed, permitting said particulate matter to flow from said reservoir section into said handle section and a closed position whereat said port is obstructed; sealing the port between said handle section and said reservoir section such that said particulate matter cannot pass therebetween; means for retaining said valve plate in abutment with said reservoir section side of said end wall, said means comprising a retainer plate having a peripheral edge and a central aperture, said valve plate being sandwiched between said end wall and said retainer plate with said central aperture in general alignment with said port; and means accessible from the exterior of said body section for pivoting said valve plate from said open position to said closed position and vice versa whereby said scoop/funnel can be used as a scoop when said valve plate is in said closed position, said particulate material entering and exiting said reservoir section through said opposite end, and as a funnel, particulate matter entering said reservoir section through said opposite end and exiting said reservoir section through said handle when said valve plate is pivoted to said open position.

* * * * *